INVENTORS
FRANK CLYNCH &
DELBERT W. FAIR
BY

ATTORNEY

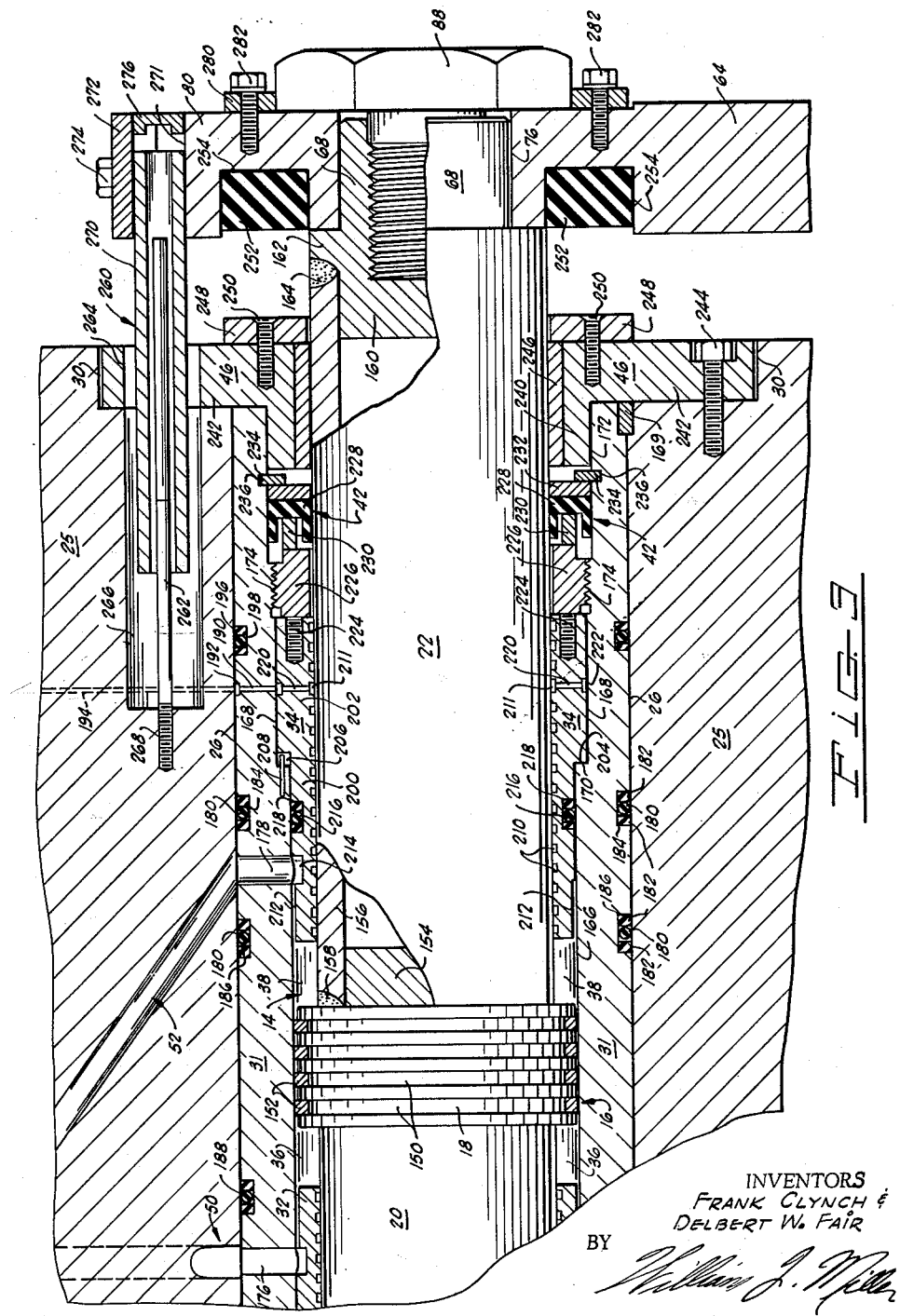

United States Patent Office 3,159,233
Patented Dec. 1, 1964

3,159,233
SEISMIC TRANSDUCER CONSTRUCTION
Frank Clynch and Delbert W. Fair, Ponca City, Okla., assignors to Continental Oil Company, Ponca City, Okla., a corporation of Delaware
Filed Nov. 14, 1962, Ser. No. 237,540
14 Claims. (Cl. 181—.5)

The present invention relates generally to transducers for inducing various types of signals in an elastic medium, and more particularly, but not by way of limitation, relates to an improved construction for a transducer especially suitable for generating seismic waves in the earth for seismographic surveying.

When practicing the system of seismographic exploration disclosed generally in U.S. Patent No. 2,688,124, issued to Doty et al. on August 31, 1954, a seismic signal of controlled frequency must be induced in the earth. The controlled signal then propagates downwardly and is reflected from subterranean interfaces upwardly and recorded as a composite signal having a plurality of the reflected controlled signals at various time phase positions on the record. The composite record is then correlated with the original transmitted signal to produce highly valuable seismic data.

The present invention is concerned with an improved construction for the transducers used to generate the controlled seismographic signals in the earth. The various types of transducers heretofore constructed for generating these seismic signals have, in almost all cases, comprised, in general, a coupling member for engaging the earth, a reaction mass and a suitable motor for reciprocating the coupling member relative to the reaction mass. The motors have conveniently taken the form of hydraulic linear actuators, electromagnetic coil and core assemblies, or various mechanical drive mechanisms, such as a pair of counter-rotating eccentric weights. Experience has demonstrated that the hydraulically actuated transducers are generally capable of generating a signal of greater amplitude in the earth than the others. This is true primarily because greater and more conrtollable forces can be created to accelerate greater masses at greater rates.

Probably the most common type of hydraulic transducer is comprised of a base plate which is pressed against the surface of the earth, a frame connected to the base plate for supporting the cylinder of a hydraulic linear actuator, and a reaction mass disposed within the frame and connected to the rod of the piston assembly of the linear actuator. This type of structure requires alignment bearings around the piston rod on either side of the reaction mass. Further, this type of construction results in a very large and bulky device if a reaction mass of considerable size and weight is employed. It has also been discovered by other workers in the art that the total mass of the structure coupled to the surface of the earth should be as low as possible. In the type of structure described above, it will be noted that in addition to the plate in contact with the earth, the supporting frame for the cylinder, the cylinder and all associated manifolding for the hydraulic fluid, add together to form a part of the mass of the member coupled to the earth.

Also, other workers in the art have discovered that shear waves, i.e., seismic waves having particle motion transverse to the direction of propagation, would be highly useful for seismographic surveying if waves of sufficient amplitude could be generated and if the frequency content of the seismographic signal could be controlled. Devices heretofore constructed in an effort to generate seismic shear waves have entailed elaborate preparation of the transmission site so that the apparatus could be coupled to the earth in such a manner as to impart a velocity to the surface particles of the earth. These devices could not be easily transported and then easily and quickly coupled to the surface of the earth, and therefore were highly impractical for actual seismographic field operations. But by far the greatest deficiency of the various shear wave generators heretofore proposed is that they are incapable of producing a signal having a controlled frequency content which can be composited and correlated to amplify the signal to noise ratio and eliminate surface interference.

Therefore, it is an important object of the present invention to provide an improved seismic transducer. In general, the improved transducer construction comprises a mass member having a cylinder bore extending therethrough, a piston member having a piston and oppositely extending rods reciprocally disposed in the cylinder bore with the rods extending from each end tof the cylinder bore, means for introducing fluid under pressure to the cylinder bore alternately on opposite sides of the piston for reciprocating the piston member relative to the mass member, and a frame interconnecting the ends of the oppositely extending rods, the frame having a coupling surface thereon for engaging a surface of the elastic medium in which the seismic waves are to be induced. The present invention also contemplates a seismic transducer of this type which is particularly adapted for generating seismic shear waves and comprises a frame of the type mentioned in which the coupling surface for engaging a surface of the elastic medium is disposed generally parallel to the piston member and on which projecting means are provided for coupling the surface to the earth for imparting a velocity thereto. The present invention further contemplates a transducer for generating pressure-type waves in which the surface on the frame is disposed at substantially right angles to the piston member. Another very important aspect of the present invention resides in the specific construction of the mass member and in the manner in which the cylinder bore extending therethrough is formed.

Therefore, the principal object of the present invention is to provide an improved construction for a hydraulically actuated seismographic transducer.

Another very important object of the present invention is to provide a seismic transducer for generating seismic shear waves having a controlled frequency content.

Another object of the present invention is to provide a seismic transducer for generating pressure waves having a construction which permits the reduction of the weight of the coupling member and thereby increases the velocities of the coupling member and therefore the earth particles.

Still another object of the present invention is to provide a transducer for generating seismic shear waves which may be easily coupled to the earth.

Yet another object of the present invention is to provide a seismic shear wave transducer which is compact and highly transportable.

Another object of the present invention is to provide a novel means for isolating a static vertical load from the transducer when the transducer is utilized to generate shear waves.

Another object of the present invention is to provide a means for reciprocating the frame which is coupled to the earth in such a manner as to minimize movement of the frame in any plane of motion other than horizontal and thereby minimize the generation of pressure waves.

Still another important object of the present invention is to provide a transducer for generating seismic shear waves in which the reaction mass is combined with the cylinder of the hydraulic linear actuator to thereby reduce the weight of the coupling mass member and therefore the total weight of the transducer.

Another important object of the present invention is to provide a construction which permits a substantial reduction in the mass of the member which is coupled to the earth to thereby increase the frequency response of the transducer.

Still another important object of this invention is to eliminate bearing alignment problems previously encountered in transducer constructions employing a separate mass reciprocated by a linear actuator.

Another object of the present invention is to simplify the hydraulic fluid manifold for the linear actuator.

Yet another object of the present invention is to provide a basic transducer component which may be operated in either the vertical or horizontal position after minor modifications for generating either pressure waves or shear waves, respectively.

A further object of the present invention is to provide a transducer of the type described which for a given reaction mass is compact and small in overall size, and which may therefore be easily transported.

Another object of the present invention is to provide a means for applying a point source of energy for generating seismic pressure waves.

Yet another very important object of the present invention is to provide a transducer actuating component which may be economically manufactured, easily assembled in a relatively short time, and which has an unusually long operating life and easy maintenance.

Another object of the present invention is to provide a transducer of the type described which may be easily modified to operate at lower frequencies by increasing the length of stroke, without materially increasing the volume of fluid within the cylinder which would tend to decrease the frequency response.

Many additional objects and advantages of the present invention will be evident to those skilled in the art from the following detailed description and drawings, wherein:

FIG. 3 is a detailed sectional view of a portion of the transducer of FIG. 1.

Figure 1:
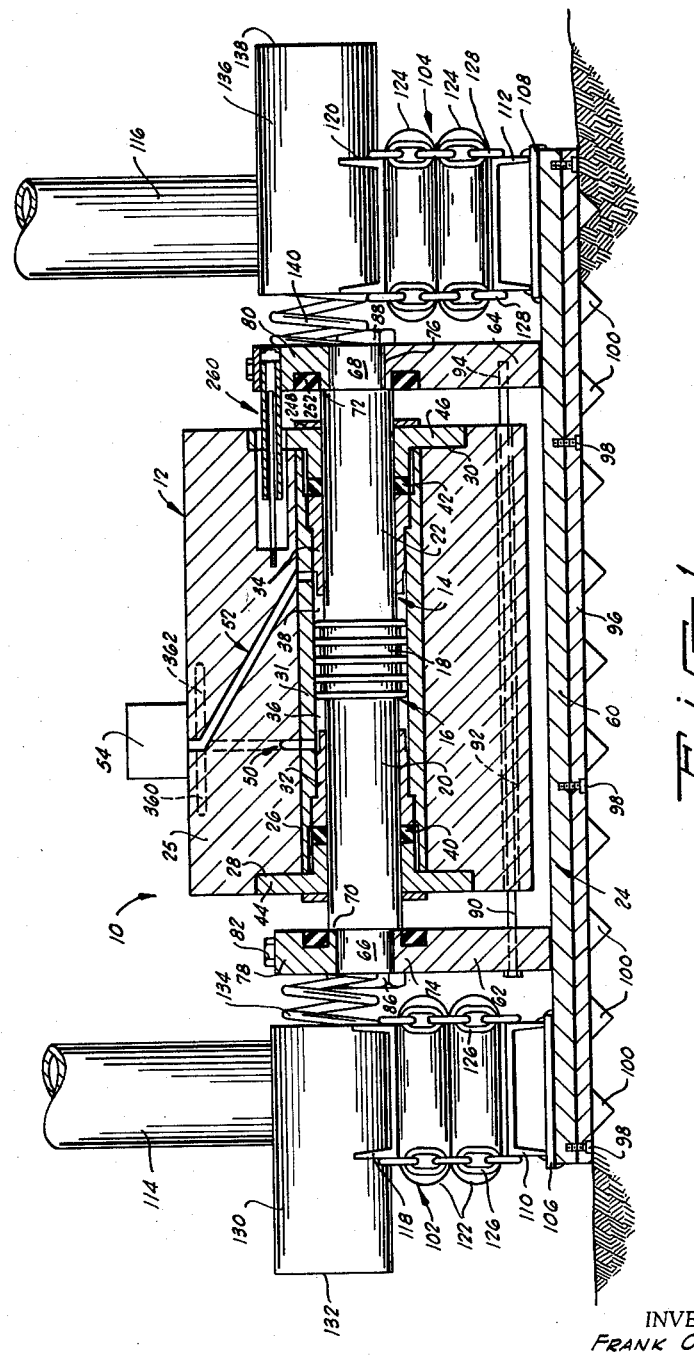
FIG. 1 is a side elevational view of a seismic transducer for generating seismic shear waves constructed in accordance with the present invention, the center portion of the device being shown in somewhat schematic section to illustrate the details of construction.

Referring now to the drawings, and in particular to FIG. 1, a transducer constructed in accordance with the present invention is indicated generally by the reference numeral 10. The transducer 10 is comprised of a reaction mass member, indicated generally by the reference numeral 12. A cylinder bore, indicated generally by the reference numeral 14, extends through the reaction mass member and a piston member, indicated generally by the reference numeral 16, is reciprocally disposed in the cylinder bore 14 and is comprised of a piston 18 and oppositely extending rods 20 and 22. A frame, indicated generally by the reference numeral 24, interconects the ends of the rods 20 and 22 which protrude from the cylinder bore 14.

More specifically, the reaction mass member 12 is comprised of a slightly elongated block 25 fabricated of a suitable material such as steel and having a substantially square cross section. The block 25 has a cylindrical bore 26 extending longitudinally therethrough with counterbores 28 and 30 in opposite ends thereof. A tubular cylinder sleeve 31 is disposed in the bore 26 and extends from the bottom of the counterbore 28 to the bottom of the counterbore 30. The interior wall of the tubular cylinder sleeve 31 forms the cylinder in which the piston 18 is reciprocally disposed, and a pair of inner bearing inserts 32 and 34 slidingly receive the piston rods 20 and 22, respectively, to form the ends of the hydraulic cylinder and thereby form fluid chambers 36 and 38 on either side of the piston 18. Also, the inner bearing inserts 32 and 34 are constructed in such a manner as to form high pressure oil seals around the rods. Suitable low pressure packing glands 40 and 42 are disposed around the piston rods 20 and 22, respectively, behind the inner bearing inserts 32 and 34. A pair of retainer bearing inserts 44 and 46 are then inserted in the ends of the cylinder sleeve 31 and have wide flange portions which are received in the counterbores 28 and 30. The retainer bearing inserts 44 and 46 may then be bolted to the mass block 25 by suitable bolts, as hereafter described in greater detail.

A pair of hydraulic fluid ports, indicated generally by the reference numerals 50 and 52, communicate with the chambers 36 and 38 of the cylinder bore 14 on each side of the piston 18. An electrically controlled servo valve 54 controls the passage of high pressure power fluid through the ports 50 and 52 in such a manner as to cause reciprocation of the piston member 16 relative to the reaction mass member 12, as will hereafter be described in greater detail.

Figure 2:
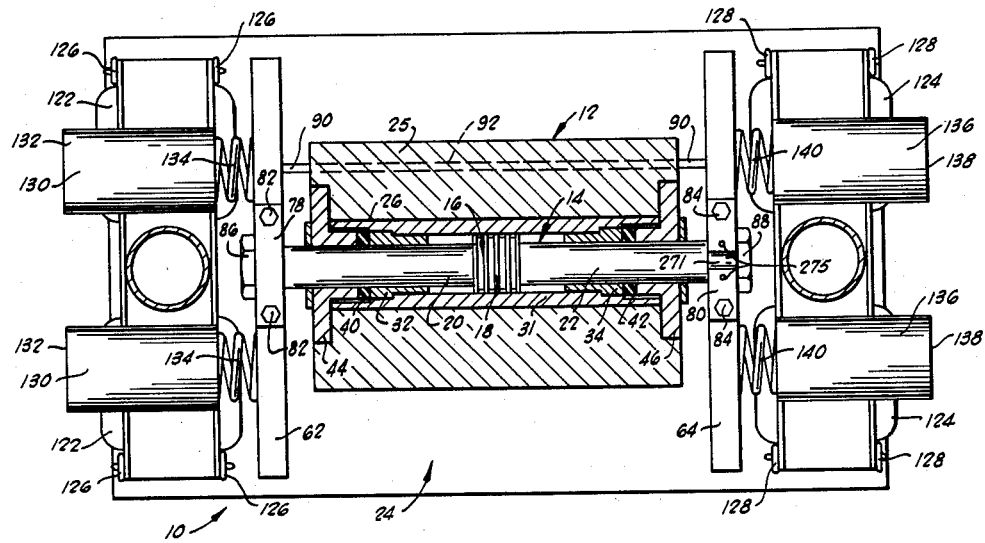
FIG. 2 is a plan view of the transducer of FIG. 1 and also shows the center portion of the device in schematic section to better illustrate details of construction.

The frame 24 is comprised generally of a base plate 60 and a pair of end plates 62 and 64 which are rigidly connected at right angles to the base plate by welding or other suitable means. The ends of the piston rods 20 and 22 have pin portions 66 and 68 of reduced diameter which form shoulders 70 and 72, respectively, and the pin portions 66 and 68 are received in semicircular cutouts 74 and 76 in the end plates 62 and 64. The pin portions are retained in place by pillow blocks 78 and 80, respectively, which are secured to the end plates 62 and 64 by bolts 82 and 84 (see FIG. 2), and a pair of large hexagonal headed bolts 86 and 88 which are then threaded into the ends of the pin portions 66 and 68. A long bolt 90 may extend through the end plate 62 and through a bore 92 in the mass block 25, and be threaded into a tapped bore 94 in the other end plate 64 to insure that the mass member 12 does not rotate about the rods 20 and 22 during reciprocation.

A removable coupling plate 96 is connected to the base plate 60 by a plurality of bolts 98. The coupling plate 96 is preferably substantially coextensive with the base plate 60 and is provided with a plurality of projections 100 which may be connected to the coupling plate 96 in any suitable manner. The projections 100 preferably are provided with flat faces facing in opposite directions generally along the longitudinal axis of the piston member 16. In this connection, the projections 100 are preferably pyramidal in shape with opposite flat sides facing as shown, so as to also provide sharp points for easy penetration of the surface of the earth. The size of the projections 100 must be varied in accordance with the nature of the soil to which the transducer 10 is to be coupled. For example, if the transducer is to be coupled to a loose, sandy soil the projections 100 may extend as much as one foot from the surface of the coupling plate 96 while still maintaining essentially the same pyramidal shape. In such a case, it will be evident that only a small number of the projections 100 would be provided, such as four, and would preferably be spaced as near the ends of the coupling plate 96 as possible. On the other hand, if the transducer 10 is to be coupled to a hard surfaced or paved roadbed, as will frequently be the case, the projections 100 need only be sufficiently large as to prevent slippage between the coupling plate 96 and the surface of the roadbed. In either event, it will be evident that by reason of the fact that the coupling plate 96 may easily be disconnected from the base plate 60, a plurality of coupling plates 96 having various sizes of projections 100 may be provided as standard equipment for a field rig so that the projections of a desired size may be quickly and easily changed while in the field.

In order to press the projections 100 into the surface of the earth and to insure that the coupling member is continually coupled to the earth during operation, it is essential that a static load be applied to hold the transducer down in the event the total weight of the transducer is not sufficient for this purpose, as will nearly always be the case. Therefore, a pair of hold-down means indicated generally by the reference numerals 102 and 104 are positioned at the opposite ends of the base plate 60. A pair of elongated rectangular plates 106 and 108 are welded to the ends of the base plate 60. A pair of transversely extending, inverted channels 110 and 112 are welded to the plates 106 and 108. A pair of vertical posts 114 and 116 are connected to and raised and lowered by a suitable hydraulic jack mechanism carried by a transporting truck. A second pair of channels 118 and 120 are connected to the lower ends of the vertical posts 114 and 116, respectively. Four resilient, pneumatic pillow bags 122 are disposed between the two channels 118 and 110 and four similar pneumatic pillow bags 124 are disposed between the two channels 120 and 112. The several pillow bags 122 and 124 may be connected to the channels 118 and 110 and the channels 120 and 112, respectively, in any suitable manner in order to retain them in position. Thus it will be noted that when the vertical posts 114 and 116 are lowered, the force exerted downwardly through the vertical posts 114 and 116 will be resiliently transmitted through the pillow bags 122 and 124 to the base plate 60.

Four chains 126 interconnect the channels 118 and 110, and four similar chains 128 interconnect the channels 120 and 112. The chains 126 and 128 are of such a length as to be loose when weight compresses the pillow bags 122 and 124, but tension as the vertical posts 114 and 116 are raised to lift the transducer 10 before the pillow bags 122 and 124 can be harmed. A pair of tubular wells 130 are welded to the channel 118 and are closed at the outer ends 132. A coil spring 134 is disposed in each of the tubular wells 130 and is slightly compressed between the outer ends 132 of the wells and the end plate 62. A similar pair of wells 136, having closed outer ends 138, are welded to the channel 120. A coil spring 140 is disposed in each of the tubular wells 136 and is slightly compressed between the outer ends 138 and the end plate 64. Therefore, as the frame 24 is reciprocated, as will be hereafter described in greater detail, the springs 134 and 140 will maintain the transducer 10 centered between the upright posts 114 and 116 without interfering with the motion of the coupling member 24.

It will be noted that each of the ends of the mass member 12 and the piston member 16 are of substantially identical construction. Accordingly, only the right hand ends of the two members, when referring to FIG. 1, are shown in FIG. 3, which illustrates several important aspects of the present invention in greater detail. Referring now to FIG. 3, the piston member 16 comprises a portion of the mass of the frame 24 which is the mass coupled to the earth, and accordingly should be as light as possible, which may be accomplished by the following construction. Therefore, the piston 18 may be machined to the proper finished outside dimensions, including the grooves 150 for receiving conventional piston rings 152. A pair of oppositely extending pins 154, only one of which is illustrated, project in opposite directions and the rod 22 is then fabricated from a length of steel pipe 156 which is telescoped over the pin 154 and welded around a circumferential seam 158. The end of the piston rod 22 is fabricated by inserting a plug 160 having a shoulder 162 into the end of the steel pipe 156 and applying a circumferential weld 164 between the shoulder 162 and the steel pipe 156. Then the rod 22 can be turned down on a lathe to the finished outside diameter. The end of the plug 160 will then form the pin 68 which can be bored and tapped to receive the bolt 88.

As previously mentioned, the block 25 is provided with a constant diameter bore 26 which receives the cylinder sleeve 31. A key 169 is provided between the cylinder sleeve 31 and the block 25 to maintain the sleeve properly oriented within the bore 26. The cylinder sleeve 31 has a constant internal diameter 166 at the center portion thereof to slidingly receive the piston 18 in a close fitting sealing engagement in the conventional manner. A first counterbore 168 is provided in the cylinder sleeve 31 to form an annular shoulder 170. A second counterbore 172 is provided to the counterbore 168 such that the outer end of the counterbore 168 may be provided with threads 174. The cylinder sleeve 31 is also provided with a pair of radial bores 176 and 178 which form parts of the fluid ports 50 and 52, respectively. A pair of O-ring seals 180 are disposed between retainer rings 182 in grooves 184 and 186 on opposite sides of the radial bore 178 to provide a fluid seal. Similar O-ring seals 188, only one of which is illustrated, provide fluid seals on each side of the radial bore 176. Another radial bore 190 through the cylinder sleeve 31 communicates with an annular groove 192 in the outer circumference of the cylinder sleeve 31. The annular groove 192 is in fluid communication with a fluid passageway 194 shown in dotted outline in the block 25 which communicates with the exhaust or low pressure fluid of the hydraulic power system, as will hereafter be described in greater detail. Another O-ring seal is disposed between a pair of spacer rings in a groove 198 in the outer circumference of the cylinder sleeve 31 to seal the fluid in the annular groove 192.

The innermost end 200 of the inner bearing insert 34 has an outside diameter such as to be received within the minimum internal diameter 166 of the cylinder sleeve 31, and an enlarged outer portion 202 which is closely received in the counterbore 168 and thereby forms an annular shoulder 204 which abuts against the shoulder 170. The shoulder 204 is provided with an alignment notch 206 which receives a pin 208 extending from a bore in the shoulder 170 to insure that the inner bearing insert 34 is properly oriented. The internal diameter of the inner bearing insert 34 receives the piston rod 22 in close sliding engagement and is provided with a plurality of annular oil seal grooves 210 which greatly facilitate the metal-to-metal seal in a manner which is well known in the art. The external diameter of the inner bearing insert 34 adjacent the innermost end is slightly less than the minimum internal diameter 166 of the cylinder sleeve 31 to provide an annular fluid passageway 212. An eccentric groove 214 is also provided in the outer circumference of the insert 34 and is in circumferential fluid communication with the passageway 212. Further, the maximum depth of the eccentric groove 214 registers with the radial bore 178 in the cylinder sleeve 31. Thus it will be noted that the hydraulic fluid port 52 includes the radial bore 178, the eccentric groove 214, and the annular fluid passageway 212. This particular port design and the advantages thereof are described in greater detail in U.S. patent application Serial Number 139,754 filed September 21, 1961 and assigned to the assignee of the present invention. An O-ring 216 is disposed between a pair of retainer rings in an annular groove 218 in the exterior surface of the inner bearing insert 34 to completely seal the fluid port 52. A plurality of radial bores 220 provide fluid communication between one of the oil seal grooves 211 and an annular groove 222 in the exterior surface of the insert 34. The annular groove 222 is in fluid communication with the radial bore 190 in the cylinder sleeve 31. It will be noted that a substantial length of the insert 34 is provided between the chamber 38 and the oil seal groove 211 which communicates with the radial bores 220 such that the several oil seal grooves 210 are sufficiently restrictive as to prevent any appreciable fluid flow between the high fluid pressure in the chamber 38 and the low fluid pressure in the groove 211 which is in fluid communication through the radial bores 220 and 190 and the passageway 194 with the low pressure exhaust fluid of the hydraulic system. Two or more tapped bores 224 are provided in the outer end of the bearing insert 34. Bolts may be threaded into these tapped bores to facilitate removal of the insert 34 from the cylinder sleeve 31. The insert 34 is retained in the cylinder sleeve 31 with the shoulder 204 abutting the shoulder 170 by an inner retainer ring 226 which is threaded into the threads 174. The outer end of the threaded retainer ring 226 may be provided with two or more oppositely disposed radially extending grooves to conveniently receive a suitable tool for rotating the retainer ring.

The low pressure packing gland 42 is comprised primarily of a resilient sealing ring 228 having a C-shaped cross section substantially as illustrated. An annular spacing ring 230 is disposed between the inner retainer ring 226 and the web of the C-shaped ring 228. An outer retainer ring 232 having a cross section substantially as illustrated abuts against the web of the sealing ring 228 and is retained in place by a snap ring 234 which is received in an annular groove 236 in the interior surface of the counterbore 172.

The retainer bearing insert 46 has a neck portion 240 which is received in the counterbore 172 and a flange portion 242 which is received in the counterbore 30. The flange portion 242 is connected to the block 25 by a plurality of bolts 244, only one of which is illustrated. A hardened bearing sleeve insert 246 which is press fitter into the retainer bearing insert 46 receives the piston rod 22 in close fitting, sliding engagement.

An annular ring bumper 248 is disposed around the piston rod 22 and is connected to the retainer bearing insert 46 by a plurality of bolts 250. An annular rubber cushion 252 is disposed in an annular groove 254 formed in the end plate 64 and the pillow block 80. Should the mass member 12 overtravel, the bumper 248 will abut the cushion 252 to prevent metal from impacting metal and thus absorb the force of impact which would otherwise cause self-destruction of the transducer.

A linear transformer, indicated generally by the reference numeral 260, is provided to maintain the mass member 12 centered between the end plates 62 and 64 during operation. The transformer 260 is comprised of a core rod 262 which is disposed along the axis of a bore 264 extending through the flange 242 and a bore 266 in the mass block 25 and is threaded into a tapped bore 268 in the block 25. The control winding 270 of the transformer 260 is wound in cylindrical form and projects into the bores 264 and 266 and is disposed around the core rod 262. The control winding 270 may be retained in a semicircular groove 271 in the pillow block 80 by a second pillow block 272 and bolts 274. The pillow block and linear transformer components are shown removed in FIG. 2, but the groove 271 and holes 275 for the bolts 274 are illustrated. A suitable plug 276 may be provided to close the end of the control winding 270. The operation of the linear control transformer 260 is well known in the art and does not comprise, per se, a part of the present invention.

After the bolt 88 has been threaded into the pin 68 of the piston rod 22, a locking ring 280 may be disposed around the hexagonal head of the bolt and bolted to the end plate 64 and pillow block 80 by a plurality of bolts 282 to insure that the bolt 88 is not loosened by operation of the transducer.

Figure 4:
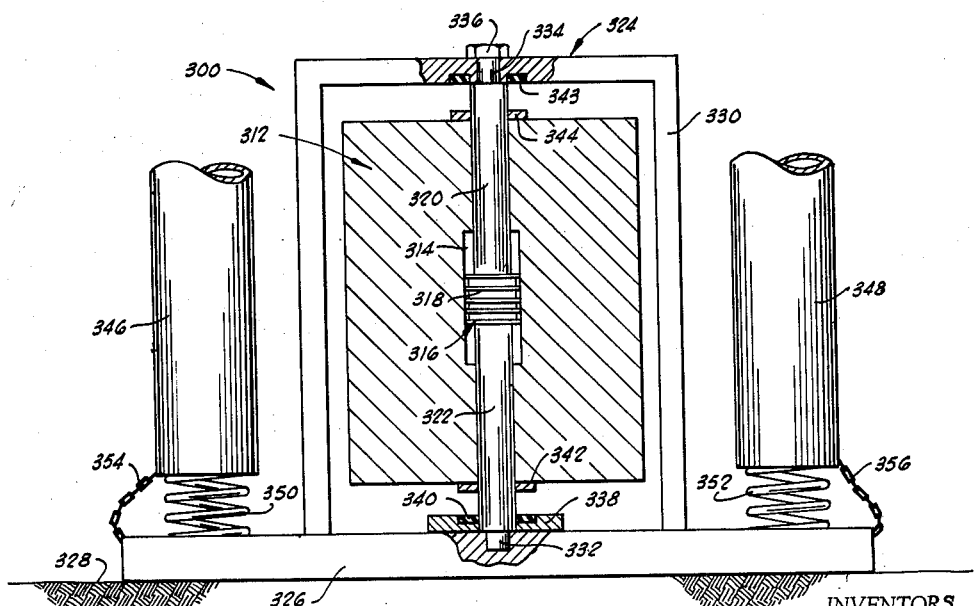
FIG. 4 is a somewhat schematic side elevational view of an alternative embodiment of the present invention showing the center portion in section to illustrate details of construction.

Referring now to FIG. 4, another embodiment of the present invention is indicated generally by the reference numeral 300. The transducer 300 is used for generating seismic pressure waves as will hereafter be described in greater detail, and employs a reaction mass member 312 which is substantially identical in construction to the reaction mass member 12 of the transducer 10, and has a cylinder bore 314 extending therethrough. A piston member 316, substantially identical in construction to the piston member 16 of the transducer 10, has a piston 318 which is reciprocally disposed in the cylinder bore 314, an upper piston rod 320 and a lower piston rod 322. The ends of the piston rods 320 and 322 are interconnected by a frame, indicated generally by the reference numeral 324, which includes a base or coupling plate 326 for engaging the surface 328 of the earth, and a bracing frame portion 330 which is connected to the upper end of the upper piston rod 320 by a bolt 336 as hereafter described in greater detail to brace the piston member 316 in a vertical position. The pin 332 on the lower end of the piston rod 322 is received in a suitable well (not referenced) in the base plate 326. The pin 334 on the upper end of the upper piston rod 320 extends through an aperture in the frame 324 and receives the large bolt 336 in a tapped bore as previously described in connection with the transducer 10. A large washer 338 is preferably disposed around the lower end of the lower piston rod 322 and is connected to the coupling plate 326 by some suitable means such as a plurality of bolts (not shown). The washer 338 has an annular groove adjacent the piston rod 322 which receives a resilient rubber washer 340. A bumper ring 342 on the lower end of the reaction mass 312 is positioned to strike the rubber washer 340 to provide a shock absorber in the event the reaction mass member 312 overtravels or otherwise impacts the base plate 326. A similar resilient rubber washer may be recessed in an annular groove in the lower face of the frame 330. A second bumper ring 344 is disposed around the upper piston rod 320 and positioned to abut the rubber washer 343 to absorb and cushion the force of impact between the reaction mass member 312 and the bracing frame 330 in the event the reaction mass overtravels in the upward direction.

The coupling plate 326 is held securely against the surface 328 of the earth by a static load applied through upright posts 346 and 348 and spring means represented by coil springs 350 and 352. Loosely strung tension means such as chains 354 and 356 interconnect the ends of the upright posts 346 and 348 and the ends of the coupling plate 326. The posts 346 and 348 are then connected to a suitable hydraulic lift mechanism on a transporting truck such that when the posts 346 and 348 are lowered, a substantial portion of the weight of the truck may be applied through the springs 350 and 352 to the coupling plate 326. The natural resonant frequency of the springs 350 and 352 should be lower than the minimum operating frequency of the transducer so as not to appreciably interfere with operation of the transducer 300, as hereafter described in greater detail. Then when the posts 346 and 348 are moved upwardly, the chains 354 and 356 will become taut and lift the transducer 300 for transport.

It will be evident to those skilled in the art that the reaction mass member 12 and piston member 16, and of course the reaction mass member 312 and piston member 316 which are of substantially identical construction, may be relatively easily manufactured and assembled. The massive block 25 can be manufactured strictly by boring techniques and does not require turning on a lathe. The other parts are sufficiently small as to be manufactured by turning using conventional techniques. Manufacture of the piston member 16 has been previously described and provides a relatively light weight yet sufficiently strong member. In order to assemble the mass member 12 and piston member 16, the various O-rings 180, 188 and 196 are placed around the cylinder sleeve 31 and the cylinder sleeve is inserted in the bore 26. The key 169 insures that the cylinder sleeve 31 will be properly aligned and maintained in that position so that the bores 176 and 178 will register with the ports 50 and 52. Next the inner bearing inserts 32 and 34 are slipped over the ends of the rods 20 and 22, respectively, and into the ends of the cylinder sleeve 31. The keyway notch 206 and key pin 208 insure that the inserts 32 and 34 are properly oriented to align the various bores of the fluid ports 50 and 52. Maintenance is facilitated by the tapped bores 224 which receive bolts and assist in removing the inserts 32 and 34 when necessary. The threaded retainer ring 226 is then screwed into the threads 174 to securely press the shoulders 204 of the inserts 32 and 34 against the shoulders 170 of the cylinder sleeve 31. Of course the O-ring 216 is placed in the annular groove 218 prior to insertion of the inner bearing inserts 32 and 34.

Next the spacing ring 230, the sealing ring 228 and the outer retaining ring 232 are inserted in the counterbore 172 of the cylinder sleeve 31. The snap ring 234 may then be inserted to secure the several rings of the low pressure packing gland 42 in position. The snap ring 234 may be provided with small apertures to facilitate removal in the conventional manner.

The hard bearing sleeve 246 may be press fitted in the retainer bearing insert 46 in the conventional manner. Then the retainer bearing insert 46 may be slipped over the end of the piston rod 22 and into the conuterbore 172 of the cylinder sleeve 31 and the counterbore 30 in the block 25. The bolts 244 then securely connect the retainer bearing insert 46 to the block 25. It will then be noted that high pressure hydraulic fluid in the chamber 38 will exert a hydraulic pressure on the innermost end of the insert 34. The force will then be transmitted through the inner retaining ring 226 to the cylinder sleeve 31, to the flange 242 of the retainer bearing insert 46, and then through the bolts 244 to the block 25. Of course high pressure hydraulic fluid in the chamber 36 will similarly transmit a force to the other end of the block 25.

The frame member 24 may be fabricated by welding the end plates 62 and 64 to the base plate 60. Then the assembled reaction mass member 12 and piston member 16 may be positioned in the semicircular cutouts 74 and 76 and the pillow blocks 78 and 80 subsequently fastened in place by the bolts 82 and 84. The components of the control transformer 260 may then be assembled by threading the core rod 262 into the tapped bore 268 and the control winding 270 secured in place by the pillow block 272 and bolts 274. Whenever it is necessary to service the reaction mass member 12 and piston member 16, the two components can easily be removed from the transporting truck merely by removing the pillow blocks 78 and 80. Of course the hold-down means 102 and 104 may be completely and permanently assembled and connected to the base plate 60 and to the upright posts 114 and 116. As previously mentioned, the coupling plate 96 may be connected and disconnected from the base plate 60 in the field so that the size of the projections 100 may be varied in accordance with the demands of the particular soil to which the frame member 24 is to be coupled.

It will also be noted by those skilled in the art that the construction of the block 25 eliminates the necessity for separate hydraulic fluid manifolding. The four-way hydraulic valve 54 may be any one of several commercially available which can be switched at a high rate by an electrical control signal. In any event, the valve 54 will be required to have a high pressure or power fluid inlet, an exhaust fluid outlet, and a pair of ports communicating with the cylinder chambers 36 and 38 on each side of the piston 18, which are the ports 50 and 52. Further, in most four-way valves of this type, there are actually two exhaust fluid ports at each end of the valve. The five ports (not illustrated) to the valve usually are on one face of the valve housing and are aligned parallel to the spool (not illustrated) of the valve. The valve 54 should be so oriented that the valve spool is at right angles to the longitudinal axis of the piston member 16, so that acceleration forces will not interfere with the operation of the valve spool. This will also position the five valve ports at right angles to the longitudinal axis of the piston member 16. Five bores (not illustrated) may then be drilled in the upper surface of the block 25 in a line such that the valve 54 may merely be bolted to the block 25 with the various ports registering with the bores. Each of the five bores then communicates with the power fluid source, the fluid sump, and the cylinder chambers 36 and 38 by suitable bores in the block 25. For example, the power fluid is introduced through bore 360 which extends to the distal side of the block 25 and is there connected to a flexible hose (not illustrated) leading to a source of high pressure power fluid. Another bore 362 communicates with the two exhaust ports from the valve 54 and also extends to the distal side of the block 25 where it is connected to a second flexible hose (not illustrated) leading to the sump of the hydraulic fluid system. The other two vertical bores may be connected to the ports 50 and 52.

In one embodiment of the transducer 10, a power fluid pressure of approximately 2,000 p.s.i. and a sump pressure of approximately 60 p.s.i. were used. The high pressure power fluid entering the bore 360 is alternately directed by the valve 54 to one of the ports 50 or 52, while the other of the ports is simultaneously connected to the exhaust bore 362. Therefore, as the valve 54 is shifted by an electrical control signal, hydraulic power fluid will first be introduced through the port 52 to the chamber 38, and fluid in the chamber 36 will be exhausted through the port 50 to the bore 362. The power fluid in the chamber 38 will then tend to move the reaction mass 12 to the right and the piston member 16 and therefore the frame member 24 to the left. Since the reaction mass member 12 has a far greater mass than the frame 24, the frame member 24 will tend to be displaced considerably more than the reaction mass member 12. Since the frame member 24 is coupled to the surface of the earth by the coupling plate 96 and projections 100, the particles at the surface of the earth will be given a velocity in a direction to the left when referring to FIG. 1. This particle velocity will then be transmitted through the earth. Upon shifting of the valve 54, the port 50 will then be placed in fluid communication with the power fluid inlet bore 360 and power fluid will be introduced to the chamber 36. At the same time, the fluid in the chamber 38 will be placed in fluid communication through the port 52 with the exhaust bore 362. The high pressure power fluid in the chamber 36 will then move the reaction mass member 12 to the left and the piston member 16 to the right. The soil particles under the coupling plate 96 will then be given a velocity to the right. The reciprocating particle velocities will then be propagated through the earth as seismic shear waves having particle motion normal to the direction of propagation.

As previously pointed out, the O-rings 180 and 216 seal the high pressure fluid passing through the port 52 to the chamber 38. Similarly disposed O-rings (not shown) of course seal high pressure fluid passing through the port 50. The inner bearing inserts 32 and 34 provide a metal-to-metal seal around the piston rods 20 and 22, respectively, which will have a very long service life. The fluid passageway 194 is in fluid communication with the exhaust fluid bore 362 and accordingly is at the relatively low pressure of 60 p.s.i. Therefore, high pressure power fluid is in the chamber 38, a substantial pressure differential will be established between the cylinder chamber 38 and the annular groove 211 which is in fluid communication with the radial bores 220. However, the relatively long interior surface of the bearing inserts 32 and 34 together with the annular oil seal grooves 210 provide a sufficient pressure drop along this path that a relatively small volume of fluid will escape between the rods 20 and 22 and the inserts 32 and 34. The annular grooves 222 and 192 in the inserts 32 and 34 eliminate the necessity for precise radial alignment between the radial bores 220 and 190 and the passageway 194. The O-ring 196 prevents fluid in the passageway 194 from escaping between the cylinder sleeve 31 and the block 25. The C-shaped resilient sealing ring 228 is then more than adequate to retain the relatively low pressure of the exhaust fluid and therefore virtually no fluid can escape between the piston rods 20 and 22 and the counterbore 172 of the cylinder sleeve 31.

In addition to providing a means for economically constructing and easily assembling the transducer, the reaction mass member 12 also provides an assembly having a very long service life. This is due in part to the fact that the low pressure fluid extending back to the sealing ring 228 continually lubricates the piston rods 20 and 22 over virtually the entire surface thereof which is contacted by sliding bearings. Further, it will be noted that there are four separate bearings, including the bearing inserts 32 and 34 and the retainer bearing inserts 44 and 46. Therefore, although the weight of the reaction mass member 12 will normally be at least 1,500 lbs., the weight is evenly distributed over the piston member 16 so as to eliminate concentrated loads thereon and thus greatly reduce wear. Since the various O-ring seals are not subject to the slightest movement, it will be appreciated by those skilled in the art that the described construction will have a long and trouble free service life.

It will also be noted by those skilled in the art that a novel transducer for generating seismic shear waves has been disclosed. The frame member 24 is coupled to the surface of the earth by pressing the projections 100 in the coupling plate 96 firmly against the surface of the earth through the hold-down means 102 and 104. This is accomplished by hydraulically or otherwise moving the upright posts 114 and 116 downwardly by the weight of a transporting truck until the pneumatic pillow bags 122 and 124 are compressed and the support chains 126 and 128 thereby made slack. The frame member 24 is then free to reciprocate in the horizontal direction within the relatively small limits required without interference from the static hold-down load. At the same time, the springs 134 and 140 will maintain the frame member 24 centered between the upright posts 114 and 116 and will thereby protect the upright posts and the truck from damage due to impact. Yet if the springs 134 and 140 are chosen so as to have a very low spring constant and a natural resonant frequency below the operating frequency of the transducer, the springs will not exert any appreciable restrictive force upon the reciprocation of the frame member 24.

Another highly advantageous feature of the construction of the reaction mass member 12 resides in the ability to quickly and easily vary the size of the chambers 36 and 38 to permit a wide range in operating frequencies. The length of the stroke of the piston 18 within the cylinder bore 14 increases as the frequency decreases. Therefore, the lowest frequency at which the transducer is to be operated determines the length of the stroke and therefore the required length of the cylinder chambers 36 and 38. On the other hand, in order to obtain maximum output velocities at the higher operating frequencies, it is necessary to reduce the volume of the chambers 36 and 38 to the minimum. Accordingly, when it is desired to operate in the frequency range from 15-120 c.p.c., for example, the inserts 32 and 34 may extend substantially to the points illustrated in FIG. 3. However, when it is desired to operate the transducer below 15 c.p.s., the inserts 32 and 34 may merely be exchanged for other, shorter inserts to thereby permit a longer stroke of the piston 18.

It will further be evident to those skilled in the art that the basic components of the transducers 10 and 300, which would be the reaction masses 12 and 312, the piston members 16 and 316, and the only slightly differing frame members 24 and 324, that a highly versatile seismic transducer design has been disclosed. The transducer 300 functions in a manner which is known in the art, in that upon reciprocation of the piston member 316 relative to the reaction mass 312, the coupling plate 326 will be reciprocated in a vertical direction to induce seismic pressure waves in the earth. However, the novel construction of the transducer 300 eliminates alignment problems normally encountered in seismic transducers. Further, the novel construction means whereby the total weight of the piston member 316 and the frame 324, including the base plate 326, may be reduced to a minimum to obtain maximum particle velocities at higher operating frequencies. In the case of both transducers 10 and 300, highly compact transducers are provided even though the reaction mass members 12 and 312 may weigh as much as 1,500 lbs. so that relatively large reactive forces may be applied to the surface particles of the earth.

Although specific structural embodiments of the present invention have been described in detail, it is to be understood that various changes, substitutions and alterations can be made therein without departing from the spirit and scope of the invention as defined by the appended claims.

What is claimed is:

1. A transducer for inducing waves in an elastic medium such as the earth comprising:
   a mass member having a cylinder bore extending therethrough;
   a piston member having a piston and oppositely extending piston rods reciprocally disposed in the cylinder bore with the rods extending from each end of the cylinder bore;
   means for introducing fluid under pressure into the cylinder bore alternately on opposite sides of the piston for reciprocating the piston member relative to the mass member; and,
   a frame interconnecting the ends of the oppositely extending piston rods, the frame having a surface thereon for engaging a surface of the elastc medium,
   whereby upon reciprocation of the piston member relative to the mass member, the frame will be reciprocated by a reaction force and the surface of the elastic medium which the frame engages will also be reciprocated to produce particle velocities which will propagate through the elastic medium as waves.

2. A transducer for inducing waves in an elastic medium as defined in claim 1 wherein:
   the surface on the frame for engaging the surface of the elastic medium is disposed generally perpendicularly to the oppositely extending piston rods,
   whereby upon reciprocation of the piston member relative to the mass member the frame will be reciprocated by a reaction force in a direction normal to the surface of the elastic medium and compression waves will be induced in the elastic medium.

3. A transducer for inducing waves in an elastic medium as defined in claim 1 wherein:
   the surface on the frame for engaging the surface of the elastic medium is disposed generally parallel with the oppositely extending piston rods,
   whereby upon reciprocation of the piston member relative to the mass member the frame will be reciprocated by a reaction force in a direction parallel to the surface of the elastic medium and shear waves will be induced in the elastic medium.

4. A transducer for inducing waves in an elastic medium such as the earth comprising:
   a mass block having a bore therethrough;
   a cylinder liner in the bore;
   a piston member having a piston reciprocally disposed in the cylinder liner and having oppositely extending piston rods extending from the ends of the cylinder liner;
   means inserted in each end of the cylinder liner and around the respective piston rods for forming the end of a fluid cylinder, for forming a fluid seal around the respective piston rods, and for providing a bearing support for the cylinder liner and mass block;

port means for introducing fluid under pressure to the interior of the cylinder liner alternately on each side of the piston for reciprocating the piston relative to the cylinder liner;

a frame interconnecting the ends of the oppositely extending piston rods; and, means on the frame for engaging the elastic medium.

5. A transducer for inducing waves in an elastic medium such as the earth comprising:

a mass block having a bore therethrough;

a cylinder liner in the bore;

means for retaining the cylinder liner within the bore;

a piston member having a piston reciprocally disposed in the cylinder liner and having oppositely extending piston rods extending from the ends of the cylinder liner;

a bearing insert in each end of the cylinder liner and around the respective piston rod extending therefrom for forming the ends of a fluid cylinder and providing a bearing support for the cylinder liner and mass block;

means for retaining the bearing insert within the cylinder liner;

annular sealing means between the bearing inserts and the cylinder liner for preventing fluid flow therebetween;

port means for introducing fluid under pressure into the cylinder liner alternately on each side of the piston for reciprocating the piston relative to the cylinder liner;

a frame interconnecting the ends of the oppositely extending piston rods; and, means on the frame for engaging the elastic medium.

6. A transducer for inducing waves in an elastic medium such as the earth comprising:

a mass block having a bore therethrough;

a cylinder liner within the bore;

a piston member having a piston reciprocally disposed within the cylinder liner and having oppositely extending piston rods extending from the ends of the cylinder liner;

inner bearing insert means in each end of the cylinder liner and around the respective piston rod extending therefrom;

means for retaining the inner bearing insert means in the cylinder liner;

outer bearings means disposed around each of the piston rods and connected to the mass block for retaining the cylinder liner within the bore and for providing bearing support for the mass block on the piston rods;

first annular resilient sealing means in each end of the cylinder liner between the inner and outer bearing means and around the piston rod for preventing fluid passage between the respective piston rods and the cylinder liner;

fluid port means in the mass block and cylinder liner for introducing fluid under pressure into the cylinder liner alternately on each side of the piston for reciprocating the piston relative to the cylinder liner and mass block;

a frame interconnecting the ends of the piston rods; and, means on the frame for engaging the elastic medium.

7. A transducer for inducing waves in an elastic medium as defined in claim 6 wherein:

the inner bearing insert means are provided with oil seal grooves in the interior surfaces thereof for restricting the flow of fluid between the inner bearing insert means and the respective piston rods;

second annular sealing means around the exterior surface of each of the inner bearing insert means for preventing fluid passage between the inner bearing insert means and the cylinder liner; and, an exhaust fluid port means communicating with the interior of the cylinder liner between the inner ends of the inner bearing insert means and the first annular resilient sealing means for transporting fluid leaked by the inner bearing insert means from the interior of the cylinder liner.

8. A transducer for inducing waves in an elastic medium as defined in claim 6 wherein:

the cylinder liner is provided with first counterbores extending inwardly from each end to form annular, outwardly facing shoulders;

the inner bearing insert means have an inwardly facing annular shoulder around the outer periphery thereof for engaging the outwardly facing shoulders; and, the means for retaining the inner bearing insert means in the cylinder liner comprises a ring disposed around the respective piston rods and threaded into threads in the first counterbores of the cylinder liner.

9. A transducer for inducing waves in an elastic medium as defined in claim 6 wherein the fluid port means in the mass block and cylinder liner are comprised of:

bores extending through the mass block;

bores extending through the cylinder liner and registering with the bores in the mass block; and, annular sealing means around the cylinder liner and disposed on each side of the bores extending through the cylinder liner for preventing fluid passage from the bores between the cylinder liner and the mass block.

10. A transducer for inducing waves in an elastic medium such as the earth comprising:

a mass member having a cylinder bore extending therethrough;

a piston member having a piston and oppositely extending piston rods reciprocally disposed in the cylinder bore with the rods extending from each end of the cylinder bore;

means for introducing fluid under pressure into the cylinder bore alternately on opposite sides of the piston for reciprocating the piston member relative to the mass member;

a frame comprised of a pair of upright members connected to the ends of the piston rods and a horizontal member interconnecting the upright members; and, means connected to the horizontal member for coupling the frame to the surface of the elastic medium with the piston member disposed generally parallel to the surface.

11. A transducer for inducing waves in an elastic medium as defined in claim 10 wherein the means connected to the horizontal member for coupling the frame to the surface of the elastic medium comprises:

a member having an irregular surface; and, the transducer is further characterized by means for statically loading the frame and pressing the irregular surface against the surface of the elastic medium while permitting motion of the frame in a plane parallel to the surface of the elastic medium.

12. A transducer for inducing waves in an elastic medium as defined in claim 10 wherein the means connected to the horizontal member for coupling the frame to the surface of the elastic medium comprises:

a plate having a plurality of projections thereon for penetrating the surface of the elastic medium; and, the plate is connected to the horizontal member by a plurality of disconnectable fastening means.

13. A transducer for inducing waves in an elastic medium as defined in claim 10 wherein:

the horizontal member is further characterized by end portions which extend beyond the upright members; and, the transducer is further characterized by resilient static loading means on each end portion for exerting a force on the horizontal member and yet permitting movement of the horizontal member in a horizontal plane, and an upright post member for applying a load to each of the resilient static loading means.

14. A transducer for inducing waves in an elastic medium as defined in claim 13 further characterized by:
resilient means disposed between each of the upright post members and the adjacent upright member for maintaining the frame substantially centered between the upright post members.

No references cited.